(12) United States Patent
Scott

(10) Patent No.: US 11,627,267 B2
(45) Date of Patent: Apr. 11, 2023

(54) IMAGE SENSOR

(71) Applicant: UNITED KINGDOM RESEARCH AND INNOVATION, Swindon (GB)

(72) Inventor: Andrew Scott, Barcelona (ES)

(73) Assignee: UNITED KINGDOM RESEARCH AND INNOVATION, Swindon (GB)

( * ) Notice: Subject to any disclaimer, the term of this patent is extended or adjusted under 35 U.S.C. 154(b) by 163 days.

(21) Appl. No.: 17/251,004

(22) PCT Filed: Jun. 12, 2019

(86) PCT No.: PCT/GB2019/051624
§ 371 (c)(1),
(2) Date: Dec. 10, 2020

(87) PCT Pub. No.: WO2019/239128
PCT Pub. Date: Dec. 19, 2019

(65) Prior Publication Data
US 2021/0258530 A1    Aug. 19, 2021

(30) Foreign Application Priority Data
Jun. 12, 2018    (GB) .................................. 1809629

(51) Int. Cl.
*H04N 5/335*    (2011.01)
*H04N 5/3745*    (2011.01)
*H04N 5/378*    (2011.01)

(52) U.S. Cl.
CPC ......... *H04N 5/37452* (2013.01); *H04N 5/378* (2013.01)

(58) Field of Classification Search
CPC .. H04N 5/37452; H04N 5/378; H04N 5/3741; H04N 5/3745; H04N 5/374;
(Continued)

(56) References Cited

U.S. PATENT DOCUMENTS 5,336,879 A    8/1994    Sauer
6,051,447 A    4/2000    Lee et al.
(Continued)

FOREIGN PATENT DOCUMENTS

EP    1463299 A2    9/2004
WO    9836557 A1    8/1998
(Continued)

OTHER PUBLICATIONS

Bub G. et al., "Temporal Pixel Multiplexing for simultaneous high-speed high-resolution imaging" Nature Methods 7, 2010 pp. 209-211.
(Continued)

*Primary Examiner* — Kelly L Jerabek
(74) *Attorney, Agent, or Firm* — Lathrop GPM LLP; Ricardo Ochoa; Brian C. Trinque

(57) ABSTRACT

The disclosure relates to active pixel sensors such as CMOS sensors. A sample stage of each pixel may comprise first and second sample switches in series between a buffer amplifier and a storage node. The first sample switch is connected to a column sample line, and the second sample switch is connected to a row sample line, such that an exposure signal is only passed to the storage node at a time when both a column sample signal and a row sample signal are active.

22 Claims, 9 Drawing Sheets

(58) Field of Classification Search
CPC ........ H04N 5/335; H04N 5/376; H04N 25/75;
H04N 25/76; H04N 25/77; H04N 25/766;
H04N 25/771
See application file for complete search history.

(56) References Cited

U.S. PATENT DOCUMENTS

| | | | |
|---|---|---|---|
| 6,252,217 | B1 | 6/2001 | Pyyhtia et al. |
| 2002/0017608 | A1 | 2/2002 | Pyyhtia et al. |
| 2005/0051775 | A1 | 3/2005 | Meynants |
| 2006/0244855 | A1* | 11/2006 | Bock ................... H04N 3/155 348/E3.018 |
| 2013/0001404 | A1 | 1/2013 | Meynants |
| 2014/0239161 | A1 | 8/2014 | Meynants et al. |
| 2017/0244921 | A1* | 8/2017 | Velichko ................ H04N 5/363 |
| 2017/0353673 | A1* | 12/2017 | Roy .................. H01L 27/14614 |

FOREIGN PATENT DOCUMENTS

WO　　WO 2008/138543　A1　11/2008
WO　　WO 2012/013918　A1　2/2012

OTHER PUBLICATIONS

Fossum E. R. "A Review of the Pinned Photodiode for CCD and CMOS Image Sensors" IEEE Journal of the Electron Devices Society, 2, May 2014, pp. 33-43.

Yu et al. "Optimizing Data Intensive Window-based Image Processing on Reconfigurable Hardware Boards" IEEE Workshop on Signal Processing Systems Design and Implementation, Nov. 2005, Athens, Greece.

GB Application No. GB1809629.7, Examination Report dated Jan. 20, 2022, six pages.

* cited by examiner

IMAGE SENSOR

CROSS REFERENCE TO RELATED APPLICATIONS

This application is a national phase entry under 35 U.S.C. § 371 of PCT/GB2019/051624 filed on Jun. 12, 2019, which claims priority to GB Application No. 1809629.7 filed on Jun. 12, 2018. The contents of each of the aforementioned patent applications are hereby incorporated by reference in their entirety.

The present invention relates to image sensors, and in particular to active pixel image sensors such as CMOS sensors.

INTRODUCTION

WO2008/138543 describes an image capture device in which pixels are grouped in a plurality of interleaved pixel subsets. The device is arranged to capture a plurality of time-separated lower resolution images by using each pixel subset in turn, which can for example be viewed sequentially as a movie. This technique is more generally described in G. Bub et al., Nature Methods 7, 209-211 (2010), where it is termed temporal pixel multiplexing.

WO2012/013918 describes a CMOS active pixel sensor device which aims to implement a similar sub pixel scheme to that described in WO2008/138543. A CMOS image sensor pixel circuit is described which has, as inputs to each pixel, a shutter signal, a column select signal (COL_IN), and a row select signal (ROW_IN). FIG. 5 of WO2012/013918, which is reproduced as FIG. 1 of the present application, illustrates these three signals as inputs to an AND gate U1. However, in the more detailed arrangements described and illustrated in FIGS. 8 and 9 of WO2012/013918, circuit arrangements combining the shutter, column select and row select signals without using a full AND gate are provided.

In the prior art arrangement shown in our FIG. 1, D1 is a photodiode which collects charge generated as a result of illumination of the pixel, and transistor Q2 acts as a transfer switch to permit the charge on the photodiode to be read during a chosen time interval to the gate of the source follower transistor Q3, from where the signal can be read out at another chosen time using the ROW SELECT signal and transistor Q4. Following reading of the charge on the photodiode, the RST signal allows for the pixel to be reset using the reset switch transistor Q1.

There are various potential problems with the circuit arrangements shown in WO2012/013918. For example, in the described circuit as shown in our FIG. 1 it will be difficult to optimise the Q1 and Q2 transistors, leading to excessive noise. In a conventional 4T pixel of a CMOS image sensor D1 and Q2 would be disposed under a pinning layer, which is not possible in the arrangement of FIG. 1. The capacitance of the floating diffusion or photodiode D1 will therefore be high so that the conversion gain will be small and the kTC noise will be high. Furthermore, the pixel signal on FIG. 1 will be stored in the silicon and the pixel will therefore suffer from parasitic light sensitivity.

Additionally, implementation of a full AND gate as shown in the figure is problematic without including bulky PMOS circuitry which typically reduces the active charge collection area of the pixel and can also lead to less efficient collection of photo charge due to the requirement for an additional n-doped well.

Indeed, other figures in the WO2012/013918 document attempt to reproduce the effect of the AND gate using various arrangements of multiple transistors, with the arrangement of FIG. 9 also requiring further NOT (ROW_IN) and NOT(COL_IN) signals. The requirement for at least a SHUTTER signal in addition to a COL_IN and ROW_IN signal also complicates the layout and programming of the device.

It would be desirable to provide an active pixel sensor which addresses limitations and disadvantages of the related prior art.

SUMMARY OF THE INVENTION

The invention therefore provides an active pixel image sensor device in which both a column sample signal and a row sample signal can be provided to each pixel to read an exposure signal into a storage node of the pixel, arranged such that both the column sample signal and the row sample signal need to be active for the transfer to take place. This can be implemented using row sample and column sample switches in series before the storage node, for example after a sense node, buffer amplifier, and/or other elements used to provide the exposure signal to the storage node. Preferably the sample switch closest in series to the storage node is turned off first, at the end of the transfer, through setting the corresponding signal to an inactive status, thereby ending the writing of the signal to the storage node before the sample switch furthest in series from the storage node is turned off. As a result, no further shutter signal beyond the column and row sample signals is required.

According to the usual terminology for active pixel sensors, a row of pixels is reset by activating a RESET signal. On this basis, the sample switch closest in series to the storage node is the preferably the row sample switch, and the sample switch further away in series before the storage node is the column sample switch. Since timing signal constraints make it preferable to switch between rows of pixels for sequential integration periods, and therefore row reset may occur immediately after an integration period for that row, unselecting a pixel using the row sample switch before the column sample switch allows a longer subsequent reset time for that pixel.

Of course, the terms "row" and "column" and the related geometrical concepts as generally used herein may be exchanged without materially affecting the geometry or function of the described devices and their operation. These and similar terms should therefore be understood accordingly, for example permitting the interchange of the row and column directions without materially affecting the disclosure or operation of the described devices.

The pixels of the device may be logically divided into a plurality of mutually exclusive subsets (i.e. no pixel belongs to more than one subset), arranged such that all pixels of any one of the subsets can be addressed at substantially the same time by the row and column sample signals and switches. In this way, the exposure signals from all pixels of any one of the subsets can be read at substantially the same time into the pixel storage nodes, such that each pixel subset can capture a sub-frame with a different integration period end time. This technique may be referred to temporal pixel multiplexing (TPM), for example see G. Bub et al., Nature Methods 7, 209-211 (2010), and permits multiple sub-frames to be very closely spaced in time because no readout cycle is required between or during the integration periods for each sub image.

However, because readouts of the all of the multiple subsets of pixels are then deferred until the exposures of all subsets are complete, the parasitic light sensitivity (PLS) of each pixel may need to be low, and this can be achieved in part in embodiments of the present invention by providing a capacitor structure such as an NMOS capacitor, a MIM (metal-insulator-metal) capacitor, or a metal fringe capacitor, at the storage node of the pixel, to store the exposure signal as a voltage rather than as charge.

Temporal pixel multiplexing is of particular interest where the radiation sensing for multiple sub-frames are required closely spaced in time, for example with the integration end times for each pixel subset spaced by less than about 10 milliseconds, and optionally much shorter for example less than 100 nanoseconds. At these relatively high speeds of operation the bias current applied to the buffer amplifier required to read the exposure signal from the sense node needs to be high to read the exposure signal quickly enough, and to this end, a bias switch may be provided in each pixel to allow the bias current to the buffer amplifier to be turned on and off quickly. Also due to high speed operation, a reset signal to each pixel of a row may be turned off when pixels of the row are selected for writing the exposure signal to the storage node, thereby effectively providing the pixels, in at least in some arrangements of pixel subsets as discussed below, with two reset periods (or for some arrangements of pixel subsets more than two reset periods) to ensure full reset of the photo sensor structure, typically a photo diode.

Accordingly, the invention provides apparatus, for example an active pixel image sensor device, comprising a plurality of pixels arranged in rows and columns, a plurality of column sample lines each connected to pixels of a different column, and a plurality of row sample lines each connected to pixels of a different row.

Each pixel then typically comprises: a photo sensor such as a photodiode arranged to generate an exposure signal representative of radiation incident on the pixel during an integration period; a sense node arranged to receive the exposure signal from the photodiode; a buffer amplifier arranged to receive the exposure signal from the sense node; a storage node arranged to store the exposure signal output from the buffer amplifier; and a readout stage arranged to provide readout of the exposure signal from the pixel, for example from the above storage node or another node arranged to store the exposure signal.

Each pixel is further provided with a sample stage disposed between the buffer amplifier and the storage node, the sample stage being arranged to control the timing of when the exposure signal is passed to the storage node, for example according to suitable timing signals as discussed further below. Note that other buffer, amplifier, switching, storage and similar stages and components may also be provide in the signal path between the sense node and the readout stage In particular, the sample stage of each pixel may comprise first and second sample switches in series before the storage node (and typically after the buffer amplifier), the first sample switch being connected to the column sample line of the pixel and the second sample switch being connected to the row sample line of the pixel, such that the exposure signal is only passed to the storage node at a time when both a COLUMN SAMPLE signal on the column sample line and a ROW SAMPLE signal on the row sample line are "on" or active.

Each pixel may further comprise a reset structure connected to the sense node, the reset structure arranged to reset the photo sensor and the sense node when a RESET signal to the pixel is active. The apparatus may then further comprise a plurality of reset lines, each reset line being connected to the pixels of a different row.

For each pixel, the sample switch closest in series to the storage node may then be connected to the row sample line, and the sample switch closest in series to the buffer amplifier may be connected to the column sample line. To end the integration period for a pixel it is preferable to turn off the series switch closest to the storage node first, to reduce noise which could otherwise result from the other series switch, and it may be preferable for the ROW SAMPLE signal to be made inactive more promptly than the COLUMN SAMPLE signal, for example so that the pixel row can be reset more quickly.

The photo sensor of each pixel may be a partially pinned photo diode, to thereby reduce capacitance of the photo diode, thereby increasing the conversion gain. High gain typically results in lower noise, in particular kTC noise which is typically the limiting noise in an image sensor of this type. If a pinned photodiode is used for the photo sensor structure then an additional transfer gate is typically provided between the photo sensor and the sense node.

The above mentioned buffer amplifier of each pixel may typically comprise a transistor arranged in a source follower configuration responsive to the exposure signal at the sense node, and the first and second sample switches may be transistors in series between an output of the buffer amplifier and the storage node.

The buffer amplifier of each pixel may be provided with a bias current by a bias structure within the pixel, the bias structure comprising a bias switch arranged to turn on the bias current to the buffer amplifier when activated by a BIAS ON signal from outside the pixel. In this way the bias current can be turned off when not needed to reduce total power consumption of the pixel, while minimizing disturbance and instability of the bias current level when turned on, noting that typically the bias structure of each pixel comprises a bias transistor connected to a corresponding transistor outside the pixel to form a current mirror for providing the bias current to the buffer amplifier of the pixel.

The above mentioned storage node of each pixel may comprise one or more of: an NMOS capacitor; a MIM capacitor; and a metal fringe capacitor. Providing a discrete capacitor structure rather than using a floating diffusion node is advantageous in improving parasitic light sensitivity, without requiring special or non-standard process steps to shield parts of the pixel from incoming photons.

The signalling used to control a device comprising the above array of pixels will typically be provided by instructions loaded into registers on the device, although other techniques for control may be used, for example a counter with a programmable decoder. The control of the device may therefore be dictated using instructions and/or data either provided in memory on the device itself or in one or more associated electronic devices such as microcontrollers and/or associated digital memory. When configuration, arrangement or operation of apparatus or a device to operate in certain ways or to provide suitable control signals to pixels and other parts of the device is discussed herein, this is therefore intended to include the provision of suitable software code and/or data in this and other ways.

The described pixel sensor device or apparatus may be configured such that the pixels comprise a plurality of mutually exclusive subsets of the pixels, and be configured to generate the COLUMN SAMPLE and ROW SAMPLE signals such that the exposure signals for readout from the storage nodes represent a different integration period for the pixels of each subset.

In particular, the COLUMN SAMPLE and COLUMN ROW signals may be generated such that transfer of the exposure signal to the storage node is stopped or ceases at substantially the same time for all pixels of a particular subset, but at a different such time for each subset. In this way, temporal pixel multiplexing can be implemented efficiently.

Using the above signals in combination with RESET signals, the apparatus can be arranged such that the integration periods for the subsets are sequential, and optionally non-overlapping.

The subsets of pixels may be arranged in various ways. For example, each subset of pixels may be interleaved with each of the other subsets, and/or each subset of pixels may be arranged to cover substantially the whole active area of the device.

Transfer of the exposure signal of each pixel from the buffer amplifier to the storage node may end by the sample switch closer to the storage node (preferably the column sample switch) being turned off before the sample switch further in series from the storage node. If the sample switches are turned off in the reverse order then stray signal from the switching process is more likely to contaminate the exposure signal stored at the storage node.

In order to form sub images, using the pixel subsets, which are closely spaced in time, readout of the exposure signals for all subsets, which may be a long operation compared with the integration times of each or even of all the subsets, may typically be deferred until the exposure signals for all of the subsets have been transferred to the respective storage nodes.

The apparatus may be configured to control the above BIAS ON signal to be active for each pixel at least when the COLUMN SAMPLE and ROW SAMPLE signals are active for selecting that pixel. However, in order to use the BIAS ON signal to save on power consumption at the pixels, the BIAS ON signal should be inactive as much as possible for any particular pixel consistent with stability and similar considerations. To this end, the BIAS ON signal may be inactive for close to at least one half of the pixels at any one time, while the current pixel subset is comprised within the other half of the pixels, or more generally inactive for at least one third of the pixels at any one time. Of course, there may be extended periods such as during the readout phase when the BIAS ON signal may be inactive for all pixels.

The invention also provides methods corresponding to the apparatus, and methods of controlling the described apparatus, as discussed herein. For example, the invention provides a method of operating an active pixel sensor which comprises a plurality of pixels arranged in rows and columns, each pixel comprising first and second switches in series between a sense node arranged to receive an exposure signal from a photo sensor, and a storage node for storing the exposure signal, the method comprising: defining a plurality of mutually exclusive subsets of the pixels; controlling the first and second switches such that, for each subset, the exposure signals of all pixels of the subset are transferred to their corresponding storage nodes at the same or substantially the same integration period end time (for example subject to minor timing differences), the integration period end time for each subset being different; and reading out the exposure signals for each the subsets only after the integration period end times for all of the subsets.

To implement temporal pixel multiplexing, the first switches of each column of pixels may be connected in common to a corresponding column sample line for control, and the second switches of each row of pixels may be connected in common to a corresponding row sample line for control.

The active pixel sensor may further comprise a plurality of reset lines, each row of pixels being connected in common to a corresponding reset line for reset. The series switch in each pixel closest in series to the storage node may then be connected to the row sample line for that pixel, and controlling the first and second switches may then comprise defining the integration end time for each pixel by turning off the series switch closest in series to the storage node before turning off the series switch furthest in series to the storage node.

The described apparatus and methods may be used to form a series of sequential image frames, each image frame being formed using the exposure signals from a different one of the plurality subsets of pixels, all of which are acquired between two sequential readout operations of the active pixel sensor.

The invention also provides suitable program instructions for operating the described active pixel sensor device, which are arranged to operate the device as described herein, and one or more computer readable media carrying such program instructions

BRIEF DESCRIPTION OF THE DRAWINGS

Embodiments of the invention will now be described, by way of example only, and with reference to the accompanying drawings of which.

DETAILED DESCRIPTION OF EMBODIMENTS

Figure 1:
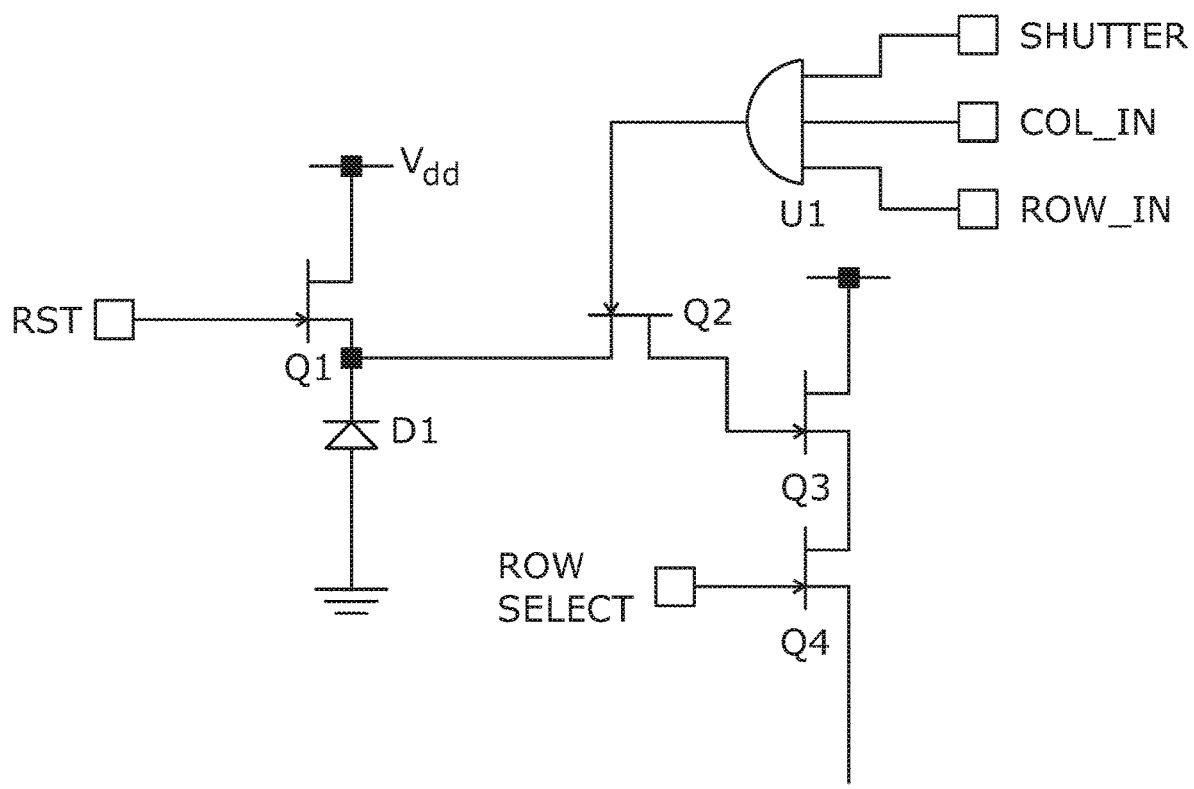
FIG. 1 shows a pixel circuit of an active pixel sensor found in the prior art.
Figure 2:
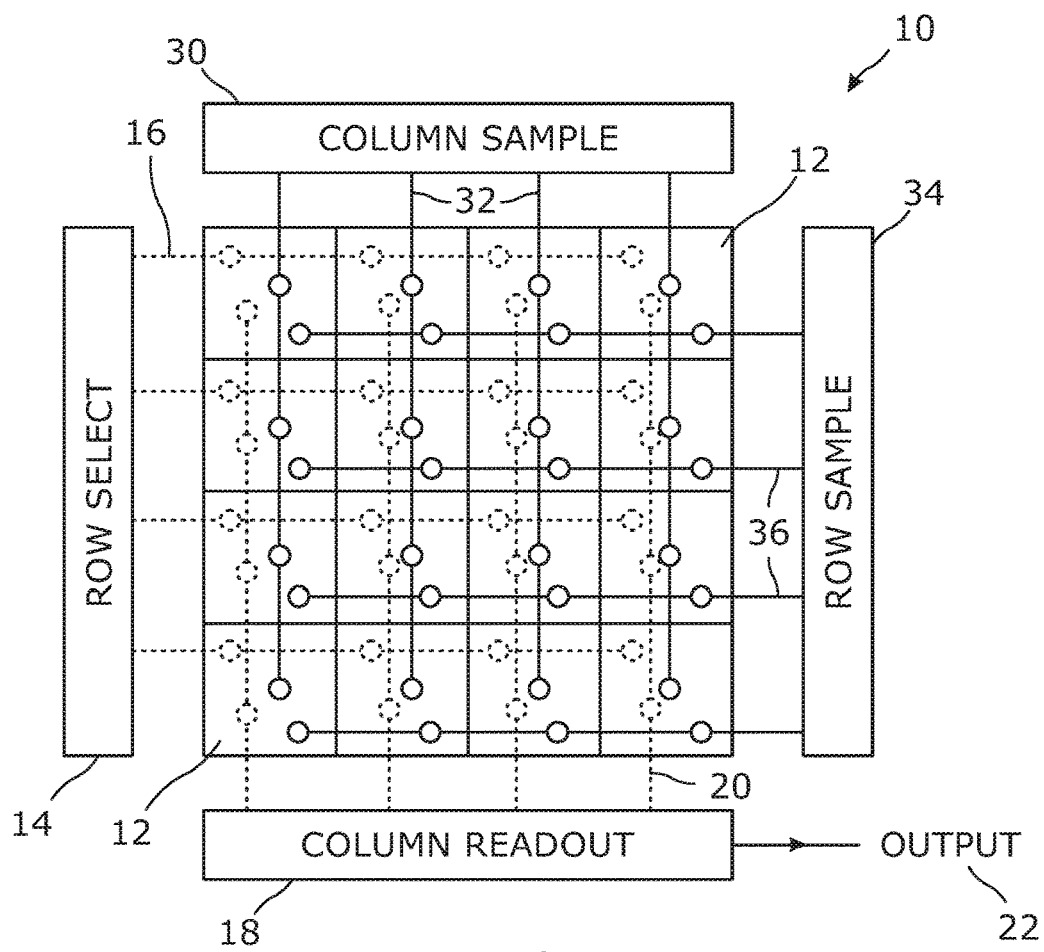
FIG. 2 illustrates layout of pixels and some of the associated off-pixel circuitry and pixel connection lines of an active pixel sensor device or apparatus according to the invention.

Referring now to FIG. 2 there is shown schematically an active pixel image sensor device 10 comprising a plurality of pixels 12, which embodies the invention. In particular, the device may be a CMOS device or integrated circuit, fabricated at least in part using a CMOS process.

Figure 3:
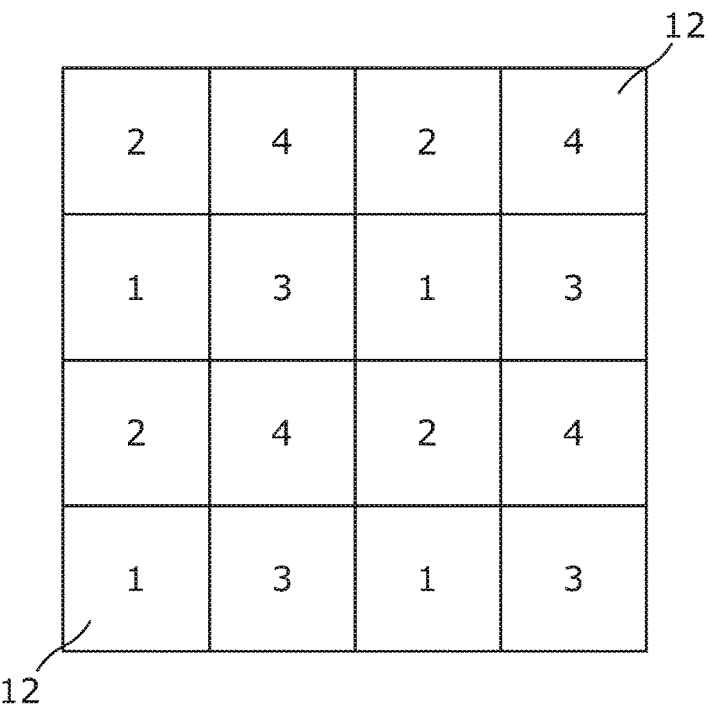
FIG. 3 provides an example of how pixel subsets may be disposed or interleaved in embodiments of the invention.

In FIGS. 2 and 3 a rectilinear grid of 4×4 pixels is illustrated for simplicity of illustration, but in practice a much larger grid for example of 1000×1000 pixels, or any other suitable size of pixel array, may be provided. Each pixel comprises a photo sensor structure such as a photodiode or phototransistor (not shown in these figures) which is sensitive to radiation such as visible and/or infrared light incident on that pixel and in particular on that photo sensor structure, and which therefore outputs an exposure signal representative of that radiation during an exposure period. The exposure period may be controlled by suitable timings of control operations of the pixel such as reset, sample, readout, and other suitable operations as required. The exposure period may be referred to as an integration period for that pixel.

The signals from all of the pixels are read out using suitable readout circuitry which is provided on the device, partly on and partly off the active pixels. As illustrated in FIG. 2 this readout circuitry typically may comprise row select circuitry 14 which is arranged to select a particular row for readout by applying a ROW SELECT signal to a current relevant row select line 16, and column readout circuitry 18 being arranged to simultaneously read the exposure signal from each pixel in the selected row using the column readout lines 20, before the row select circuitry 14 then selects the next row for reading.

In this way, the exposure signals from all of the pixels 12 may be passed to an output 22 of the device for forming an image representative of the radiation incident on the device 10. Readout of all rows for a large CMOS image sensor device may typically take a few milliseconds, although this may depend heavily on factors such as the number of pixels which must be read. The exposure signals may typically be digitised, either on or off the device.

In many prior art sensor devices a rolling shutter scheme is used in which a particular row of pixels is read after the end of the integration period for that row, but before the end of the integration periods for subsequent rows yet to be read out. The integration periods for successive rows are therefore staggered, and this permits the readout circuitry to be continually employed reading out successive rows of pixel signals. This allows longer integration periods for each pixel, but results in the signals from each row representing a different integration period leading for example to image distortion when parts of the image are moving rapidly relative to the total readout time for a single frame.

If it is instead desired for the integration periods for all rows to coincide, at least approximately, then a rolling readout scheme cannot be used. Instead, the pixels of some prior art CMOS image sensor devices can be triggered to end the integration period using a global shutter signal, enabling the integration period for all pixels to end at approximately the same time. Under a global shutter scheme the start of the next integration period for all pixels must wait until the previous readout cycle for all the pixels has been completed.

The start of an integration period for a particular pixel in the device of FIG. 2 may be triggered by using a reset (RST) signal for that pixel. Reset signal lines (omitted from FIG. 2 for clarity) are typically provided extending along each row (or sometimes along each column) of pixels, allowing all the pixels of each row (or each column) to be reset at the same time, even though not all pixels reset at a particular time need be used to provide an output exposure signal based on that reset time. In some embodiments of the present invention, all pixels of the sensor device, from all rows or columns, may be reset at substantially the same time, but more typically the reset signal will cycle between each of a plurality of interleaved subsets of the rows, to provide staggered integration period start times, as discussed in more detail below.

In the arrangement of FIG. 2, each pixel is arranged such that the exposure signal output by the photo sensor structure of that pixel is only stored for subsequent read out from the pixel if signalled to do so by column sample circuitry 30 and row sample circuitry 34. The column sample circuitry 30 is operable to select particular columns of pixels using column select lines 32, and the row sample circuitry 34 is operable to select particular rows of pixels using row select lines 36. By providing an activate signal on a selected plurality of column select lines and on a selected plurality of row select lines at the same time, a subset of the pixels corresponding to the coincident rows and columns is selected.

Each pixel of the sensor is arranged to respond to such subset selection by storing the exposure signal from the photo sensor structure for subsequent read out. Deactivation of the same subset signalling for a pixel triggers the end of the integration period for that pixel by terminating the process of storing the exposure signal for subsequent readout.

Therefore, by changing these signalling patterns to sequentially select each of a plurality of subsets of the pixels, both storage of the exposure signals for readout and the integration period end time for the pixels of those subsets is sequentially signalled.

Following the ends of the integration periods of all of the plurality of pixel subsets, a readout phase can then commence in which the readout circuitry described above is used to read out the exposure signals from all of the pixels. Since each pixel subset has a different integration period, the multiple pixel subsets can then be used to construct a corresponding set of multiple image frames, each image frame of the set having a different integration period.

One particular example sequence of subsets of pixels 12 which can be selected using the column sample and row sample circuitry and lines of FIG. 2 is illustrated in FIG. 3, in which the pixels of a first subset are labelled "1", those of a second subset are labelled "2", and so forth. In this case, bearing in mind that such a subset scheme would typically be extended and repeated over substantially the whole of a sensor with many more pixels than illustrated in FIG. 3, it can be seen that the pixels can be divided into subsets such that each subset includes pixels from substantially all of the active area of the sensor. Similarly, the pixels can be divided into subsets such that the pixels of each subset are interleaved with those of the other subsets.

Various other pixel subset arrangements can be implemented if desired, for example with each of a plurality of different subsets extending substantially over a different segment of the active area of the sensor, such as four subsets each covering one quarter segment of the active area.

The device of FIG. 2 may particularly be used to output a set of image frames, each frame of the set comprising a different subset of the pixels, the frames having integration periods which are preferably short and closely spaced. For example the integration periods may each having a duration of less than about 10 microseconds, less than about 1 microsecond, or less than about 100 nanoseconds, and the integration periods may be essentially continuous or only minimally spaced, for example with no spacing between the integration periods or with time gaps of less than about 10 microseconds, less than about 1 microsecond, or less than about 100 nanoseconds between the end of one integration period and the start of the next.

Figure 4A:
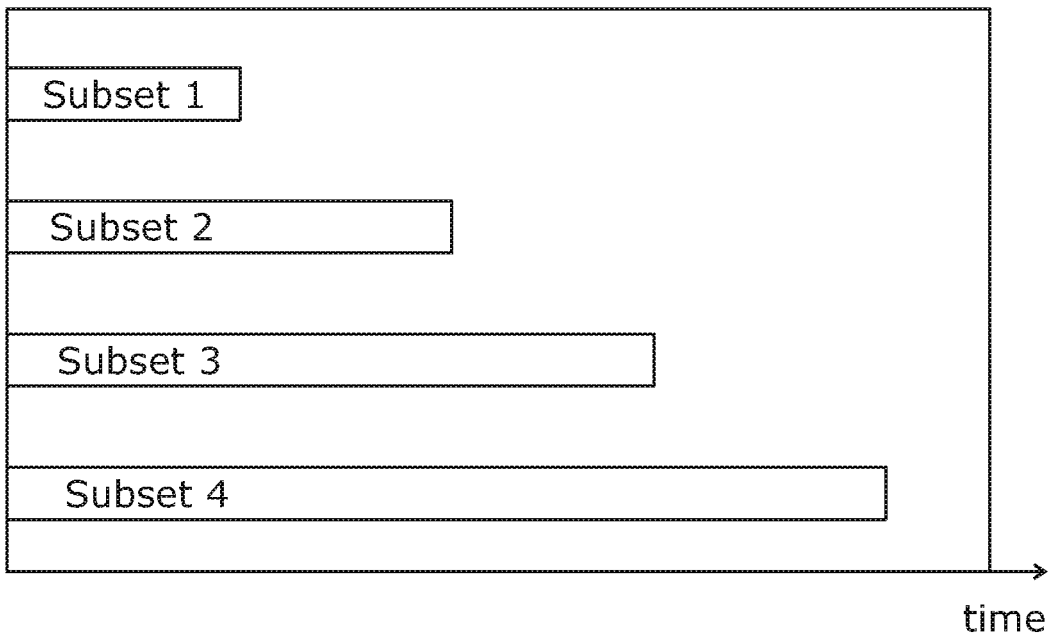
FIGS. 4a and 4b show how different integration periods (exposure periods) for different pixel subsets may be provided, by suitable control or operation of the described apparatus.
Figure 4B:
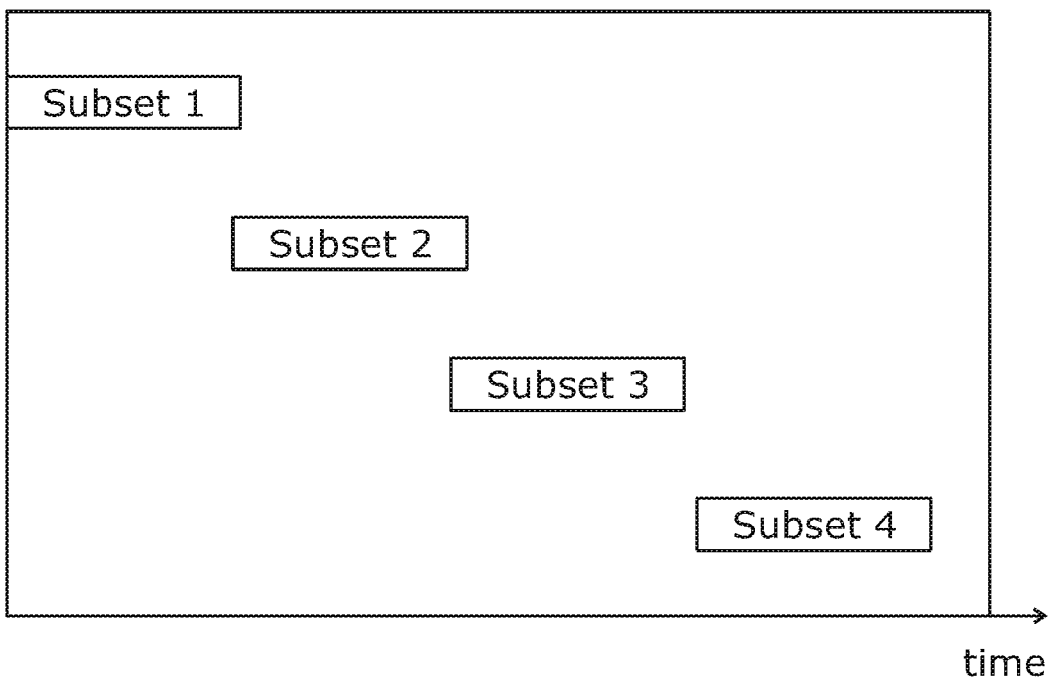

If all pixel subsets were reset at the same time, and not reset again until the end of the integration periods for all subsets, it would be possible for all of the output frames of a set to have the same integration period start times but different integration period end times, as illustrated in FIG. 4a for four different pixel subsets. However, by suitable control of the reset signals as discussed in more detail below each subset may also have a different start time as illustrated in FIG. 4b. Although in this way, the integration periods for the plurality of subsets may be sequential and non-overlapping, various other arrangements of integration times may be provided using suitable signalling, for example with integration times for sequential subsets being overlapping, non-overlapping, or spaced apart in time.

Figure 5:
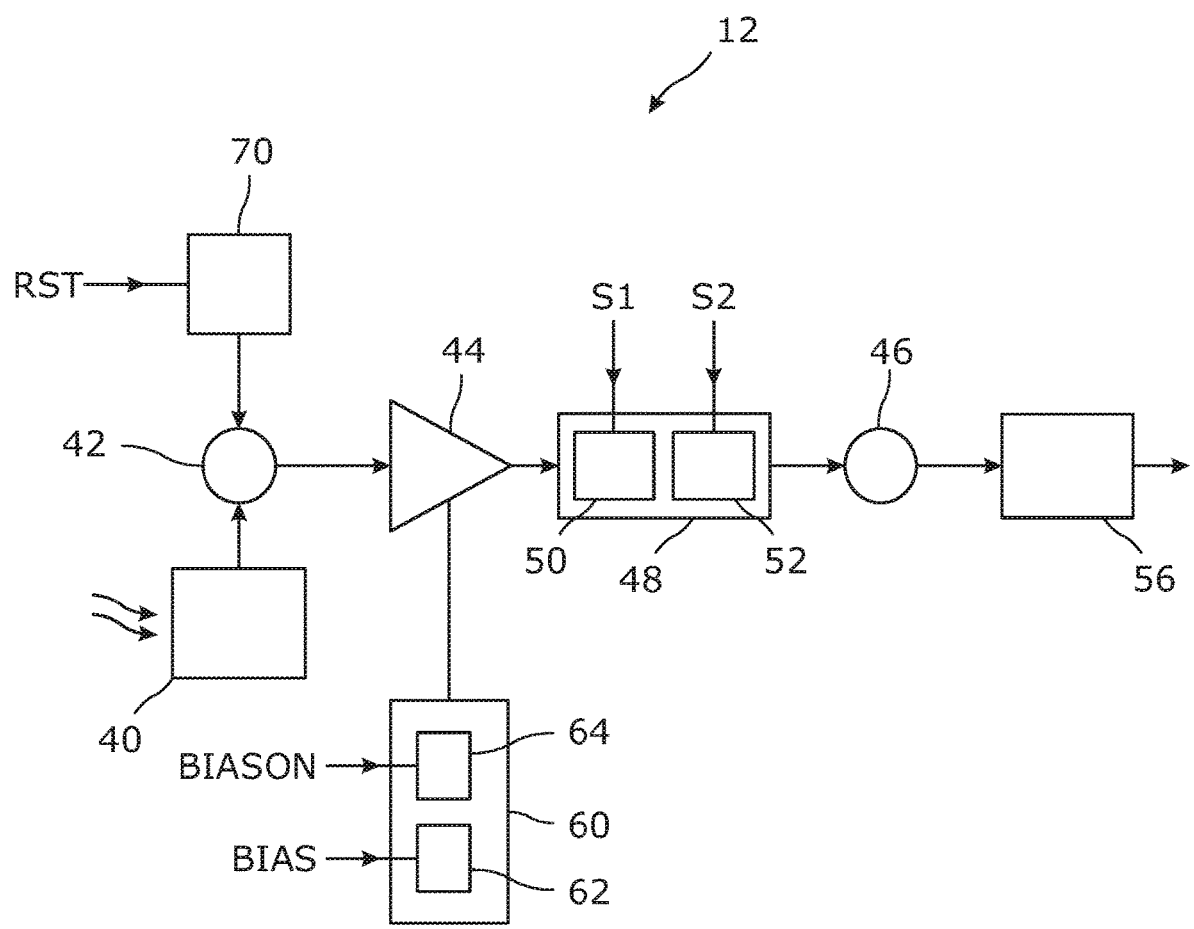
FIG. 5 shows a circuit structure for an active pixel suitable for use in the apparatus of FIG. 2.
Figure 6:
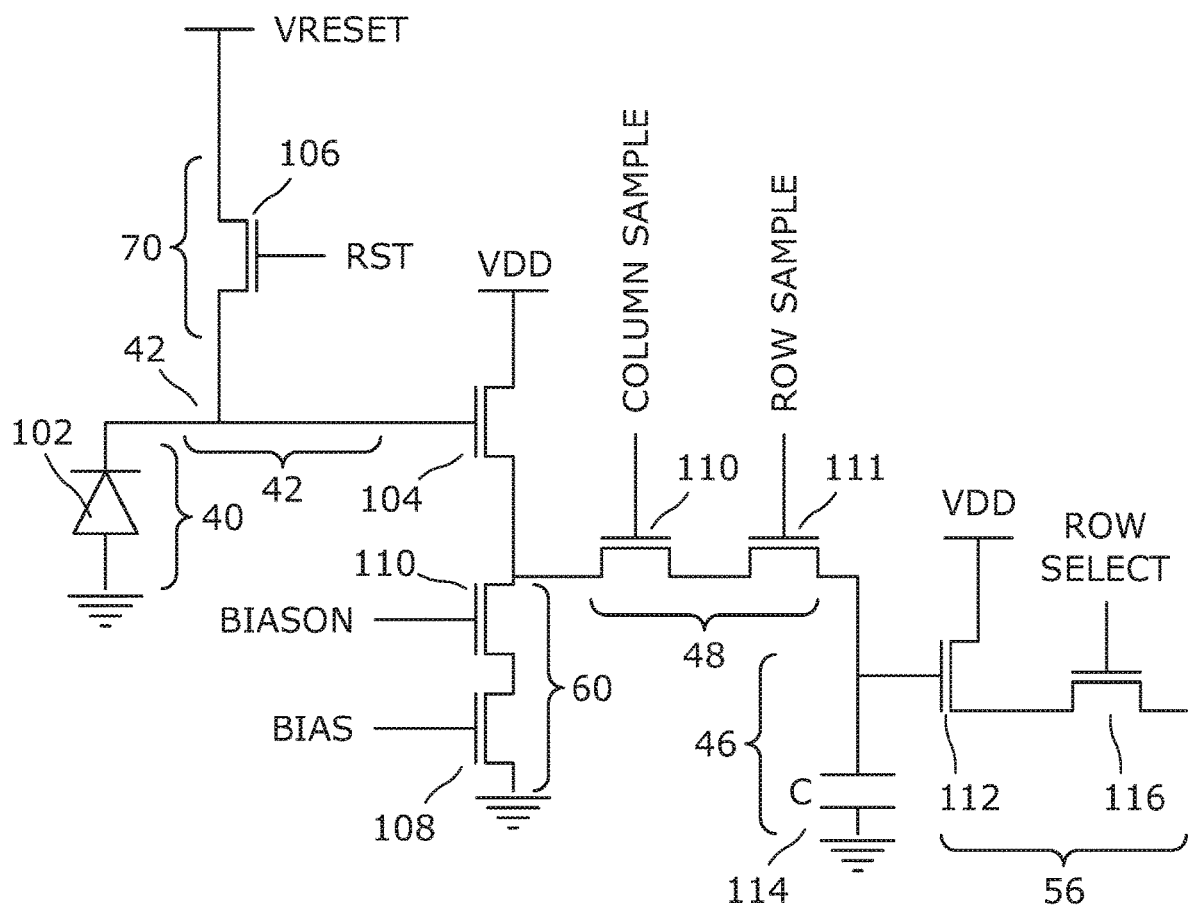
FIG. 6 shows how the circuit structure of the pixel of FIG. 6 may be implemented in more detail on a CMOS sensor.

FIG. 5 illustrates how a pixel of FIG. 2 or 3 may be implemented in general terms, and FIG. 6 illustrates how such a pixel may be implemented using more particular structure types familiar to the skilled person aware of CMOS active pixel sensors of the prior art.

Referring first to FIG. 5, each of a plurality of pixels 12 of the sensor device comprises a photo sensor structure 40 arranged to generate an exposure signal representative of radiation incident on the pixel during an integration period. The photo sensor 40 may typically be provided using a photodiode or phototransistor. If a photodiode is used, this may be provided using a pinned, partially pinned, or unpinned photodiode as desired, subject to providing suitable associated structures, such as an additional transfer gate in the case of a pinned photodiode. A pinned or partially pinned photodiode may be used to reduce capacitance of the photo sensor and improve signal to noise ratio. Pinned and partially pinned photodiode arrangements suitable for use with embodiments of the present invention are described in E R Fossum, IEEE Journal of the Electron Devices Society, vol. 2, no. 3, May 2014, and in U.S. Pat. No. 6,051,447 respectively.

The exposure signal output by the photo sensor structure 40, and any transfer gate or similar as required, is passed to a sense node 42. The sense node may typically be provided by a floating diffusion, if the photo sensor structure 40 is pinned, or simply by the connections between the photo sensor structure and the buffer amplifier 44. A buffer amplifier 44 receives the exposure signal from the sense node. The buffer amplifier functions to buffer the exposure signal at the sense node 42 to an output of the amplifier, which is connected in turn to a storage node 46 for storage of the exposure signal, pending read out from the pixel. The storage node may be provided for example by a suitable capacitor, such as an NMOS capacitor, or MIM capacitor.

Between the buffer amplifier 44 and the storage node there is provided a sample stage 48. The function of the sample stage 48 is to selectively control when the exposure signal at the output of the buffer amplifier 44 is connected to the storage node 46. In this way, following reset of the pixel, whether or not the buffer amplifier 44 is connected to the storage node 46 can be used to determine whether the exposure signal is stored at the storage node 46 for that reset cycle.

In particular, the sample stage 48 typically comprises first and second switches 50, 52 in series with each other and in series between the buffer amplifier 44 and the storage node 46. The switches 50, 52 are driven by respective signals S1 and S2. One of these signals is provided by the column sample line 32 and one by the row sample line 36 connected to the pixel and discussed above in connection with FIGS. 2 and 3. Either the column sample line or the row sample line may be connected to the switch which is closer to the storage node, but in some embodiments the row sample line is so connected. The integration period for a currently selected pixel may terminated by turning off either of the S1, S2 switches since this disconnects the storage node 46 from the buffer amplifier 44. However, turning off the second, S2, switch first is advantageous because this then reduces noise in the exposure signal from the turning off of the first, S1, switch. If each reset line runs along a row of pixels, then signal timing constraints may require prompt turning off the currently active row sample line before the current row is subject to another reset, whereas the signal timing constraints for the current column are typically less harsh.

After the exposure signal for a pixel has been written to the storage node 46, and the end of the integration period has been effected by ceasing the selection of that pixel using the sample stage, it is subsequently read out during a readout phase for all of the pixel subsets using readout circuitry 56 on the pixel, as well as related circuitry of the device which is off the pixel, as already described above.

The buffer amplifiers 44 are a significant drain of current within the device, and especially so if the integration periods are short (for example of the order of 0.1-10 milliseconds) such that the exposure signal at the sense node must be read quickly and without excessive noise to the storage node 46. The buffer amplifier 44 of FIG. 5 is therefore provided with a bias structure 60 which comprises a bias device 62 arranged to provide the correct bias current to the buffer amplifier 44 on the basis of a BIAS signal received from off pixel.

Maintaining the required current bias for the buffer amplifiers 44 for all pixels continuously would require large currents across the whole device. On the other hand, to maintain uniformity of performance between pixels across the device, the BIAS current signal for each pixel is typically provided using a current source and first side of a current mirror common to all pixels (with the second side of the current mirror being provided separately in each pixel by bias device 62), and turning this common current source on and off rapidly is not desirable for example because of resulting current swings and other instabilities.

The implementation depicted in FIG. 5 therefore also includes within the bias structure 60 an additional bias switch 64 which is operated using a BIASON signal. When the correct bias is required for operation of the buffer amplifier, the BIASON signal can be changed to an active state to thereby turn on the bias switch 64, thereby connecting the buffer amplifier 44 to the bias device 62. In this way, bias device 62 can be operated continuously or at least with less switching on and off, but the actual bias current at the buffer amplifier 44 of each pixel can be selectively provided only when needed.

The BIASON signal may be provided in various ways, but typically a separate bias switch line may be provided for each column or for each row of pixels. For example, if each bias switch line extends along a column of pixels, the BIASON signal for a particular column may be active substantially only when the column sample line for that column of pixels is also active, although more complex signalling schemes may be used.

The pixel depicted in FIG. 5 also includes a reset structure 70 which operates under control of a reset signal RST, to determine the start of the integration time for those pixels of a current pixel subset as selected using the S1 and S2 signals. The reset structure 70 in FIG. 5 is also connected to the sense node 42, such that when the RST signal is made active the exposure signal which has accumulated at the photo sensor structure is drained away or otherwise cancelled, thereby allowing a new integration period to begin.

It should be noted that the arrangement of FIG. 5 is not intended to include all possible elements of the pixel. For example, a device may be provided in which pixels contain further switching, amplifier, signal storage, control, readout and other elements not depicted or discussed here. For example one or more further storage nodes 46 may be provided in series or in parallel with the storage node 46, along with suitable switching to enable input of exposure signals to and output of exposure signals from these storage nodes. Such further storage nodes may be used to enable the pixel to store multiple exposure signals from different integration periods, and/or to store a baseline signal, typically acquired during or immediately after a pixel reset, to be used as a reference for the one or more exposure signals in a correlated double sampling process or similar.

An example of how the pixel circuit of FIG. 5 may be implemented in more detail using structures familiar from prior art implementations of CMOS active pixel sensors is depicted in FIG. 6, using transistors implemented as FETs. NMOS transistors may be preferentially used in such a pixel because they avoid the need for an underling n-doped region which would tend to collect photo generated charge intended for collection at the photo sensor.

The photo sensor structure of FIG. 5 is provided in the arrangement of FIG. 6 by a partially pinned photo diode 102 which is connected between the circuit ground and the gate of a source follower NMOS transistor 104. The source follower transistor provides the buffer amplifier 44 of FIG. 5, with the drain of the transistor being connected to VDD.

The reset structure 70 of FIG. 5 is provided in the arrangement of FIG. 6 by another NMOS transistor 106 connected between a VRESET voltage (this could be VDD) and another output of the photo diode 102. The gate of the reset transistor 106 is driven by a reset signal RST. The sense node 42 is therefore provided in this circuit by the electrical connectivity and diffusion region between the photo diode 102, the buffer amplifier transistor 104, and the reset transistor 106.

The buffer amplifier provided by the transistor 104 is biased using a bias structure comprising a bias mirror transistor 108 connected by its gate to the other half of a current mirror common to multiple pixels (using the depicted BIAS signal), and with source and drain connected between a bias switch transistor 110 and circuit ground. The bias switch transistor 110 is controlled at its gate by the BIASON signal discussed above, in order to switch the bias current provided by bias mirror transistor 108 on and off for the source follower transistor 104, thereby saving power consumption when reading of the exposure signal from the sense node 42 to the storage node 46 is not required.

The exposure signal on the sense node 42 during and up until the end of an integration period can be read through the source follower transistor 104 to the storage node 46 using the sample stage 48 which comprises a first sample NMOS transistor 110 having a gate coupled to the column sample line for the pixel which provides a COLUMN SAMPLE signal, and a second sample NMOS transistor 111 having a gate coupled to the row sample line for the pixel which provides a ROW SAMPLE signal. The sources and drains of these two sample transistors are connected in series between the drain of the source follower transistor 104 and the storage node 46, such that the exposure signal from the sense node 42 is only applied to the storage node 46 when both the ROW SAMPLE and COLUMN SAMPLE signals are active.

The storage node 46 which is connected between the sample stage 48 and a readout transistor 112 comprises a storage capacitor 114 also connected to ground. An NMOS capacitor may be used for this purpose, or another capacitor structure such as a MIM (metal-insulator-metal) capacitor, a metal fringe capacitor, or some combination of two or more of the above, or another combination or structure.

The exposure signal may be read out from the storage capacitor 114 when required by connection of the storage node 46 to the gate of a readout transistor 112, having a drain connected to VDD and a source connected to the pixel signal output through a row select transistor 116, of which the gate is driven by a ROW SELECT signal.

Figure 7:
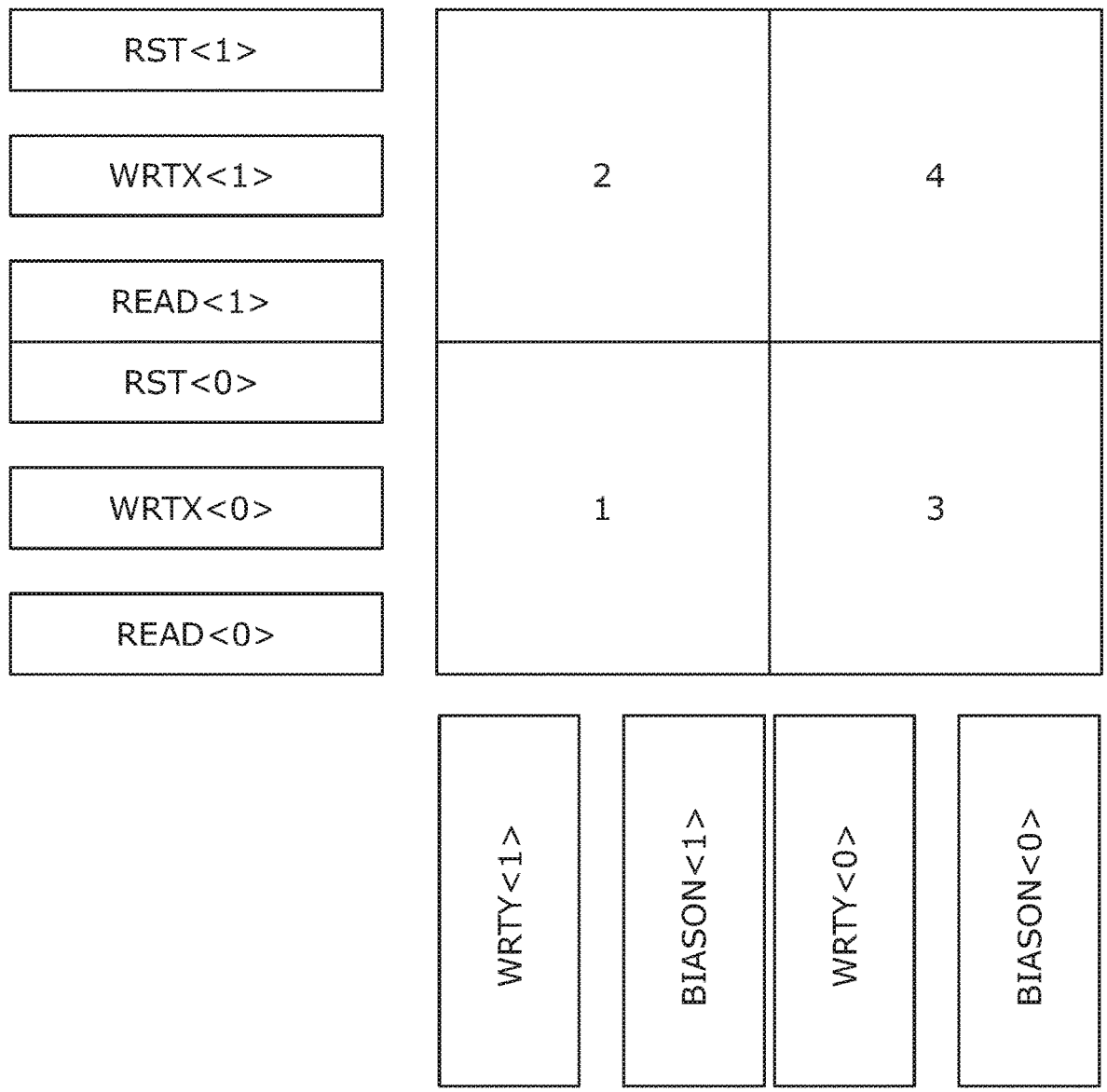
FIGS. 7 and 8 show an example of signal timing for driving the pixels and device of previous figures.
Figure 8:
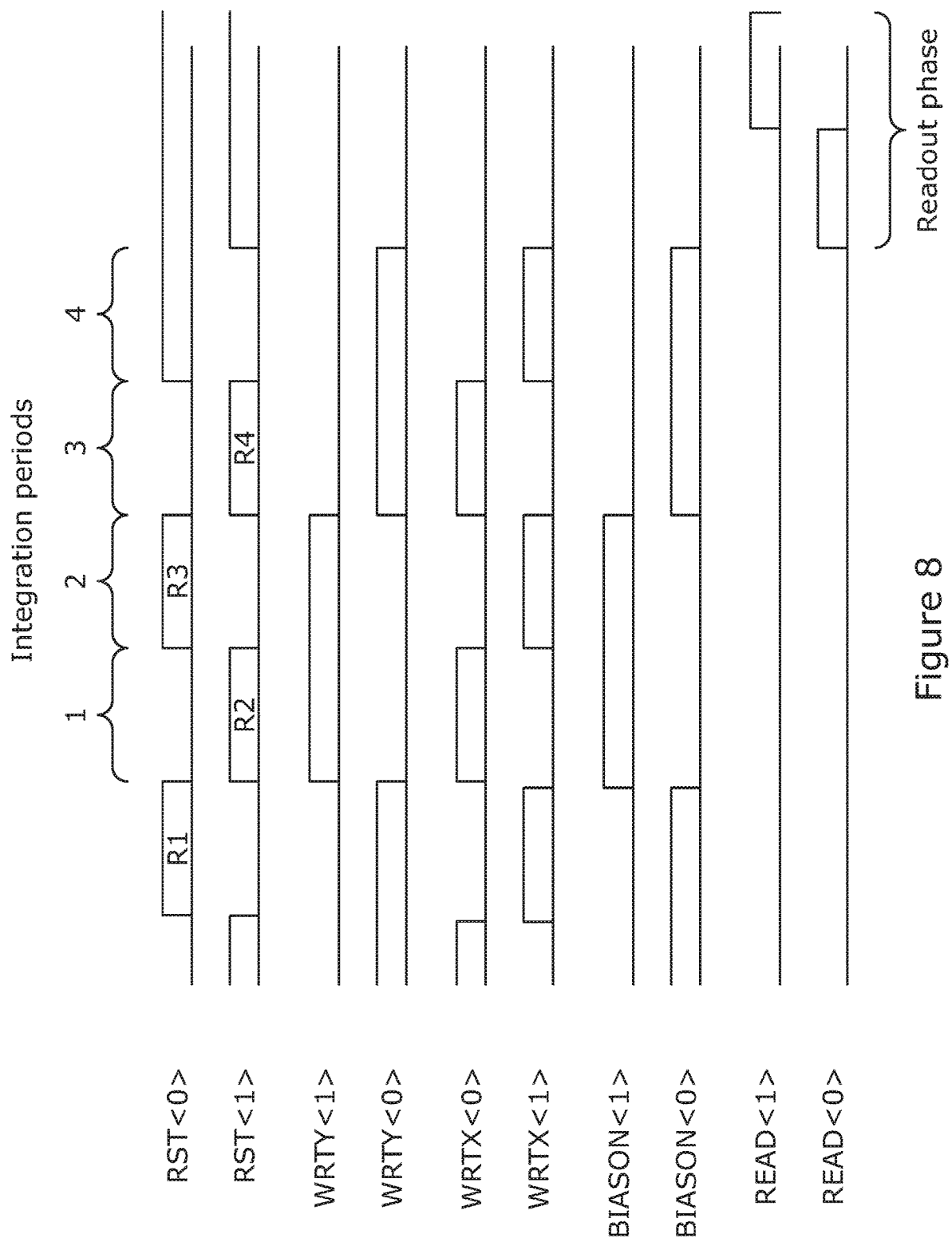

FIGS. 7 and 8 illustrate how signalling to an array of pixels of a sensor as described above may be used to effect the described temporal pixel multiplexing in which pixels are grouped into subsets each having a different integration period. This signalling is illustrated in a simplified manner without full details such as minor adjustments in timings and guard periods between different signals, in order to better explain the principles of operation.

To this end, FIG. 7 depicts just four pixels of a larger array, with these four pixels each belonging to a different one of four subsets and therefore being correspondingly labelled 1, 2, 3, 4. The reset (RST) signals for the upper and lower rows of pixels are depicted as RST<1> and RST<0>. The ROW SAMPLE signals of FIG. 7 are similarly depicted as WRTX<1> and WRTX<0>, while the COLUMN SAMPLE signals of FIG. 7 for the left and right columns are depicted as WRTY<1> and WRTY<0>. The ROW SELECT signals of FIG. 7 for the upper and lower rows are depicted as READ<1> and READ<0>, and the BIASON signals of FIG. 6 for the left and right columns are depicted as BIASON<1> and BIASON<0>.

One way in which these various signals may be coordinated to provide temporal pixel multiplexing is shown in FIG. 8. In a first, reset period R1, a reset signal RST<0> is sent to all pixels of subsets 1 and 3, which lie on common rows. At the end of this reset period R1 the WRTY<1> and WRTX<0> signals are made active to select the pixels of subset 1 only, such that the buffer amplifiers 44 of these pixels are connected to the storage nodes 46. In this way integration period 1, as noted at the top of the timing diagram commences. As the exposure signal develops on the photo sensor structures of pixel subsets 1 and 3 following the reset signal RST<0>, only the exposure signals of pixel subset 1 are transferred to the respective storage nodes. When the integration period 1 is terminated by turning off of the WRTX<0> signal, only the exposure signals for the pixels of subset 1 have therefore been stored in the respective storage nodes.

During integration period 1, the RST<0> signal is of course inactive, but instead the RST<1> signal is active therefore applying a reset signal to the pixels of subsets 2 and 4. At the end of the first integration period the RST<1> signal is then made inactive, the WRTX<1> signal is activated in order to select the pixels of subset 2 in combination with the WRTY<1> signal, and integration period 2 for pixel subset 2 commences.

The integration periods 1 and 2 are then repeated but with the WRTY<0> signal active in place of the WRTY<1> signal so as to select pixels subsets 3 and 4, at the end of which integration periods for all four pixel subsets have been completed and the respective exposure signals stored in the storage nodes. A readout phase for all pixel subsets can then commence. Although the READ<0> and READ<1> signals depicted in FIG. 8 are of similar length to the separate integration periods 1-4, this is just for convenience of depiction. In practice, each integration period or reset period might be of the order of 100 ns long, while each readout pulse might typically be around 2 microseconds long.

Although the WRTX and WRTY signals of FIG. 8 are shown to rise at the boundaries of the reset signals, in practice each these signals could rise before or after the respective reset boundary, because it is the end of the reset period for a pixel and not this rise timing that determines the start of the pixel's integration period. The WRTX and WRTY signals should, however, fall at least slightly before any subsequent reset signal for the same pixel, because such a reset signal will otherwise degrade or remove the exposure signal from the integration period.

During integration periods 1 and 2 the BIASON<1> signal is active, thereby ensuring that the buffer amplifiers for pixel subsets 1 and 2 operate correctly to pass on the exposure signal to the storage nodes during these two integration periods, with the BIASON<0> signal similarly providing for correct operation of the buffer amplifiers for pixel subsets 3 and 4 during integration periods. It can be seen that by providing bias switch lines which run perpendicular to the reset signal lines (so if the reset signal lines run along rows, the bias switch lines run along columns and vice versa), the biason signals can switch at a lower rate, thereby helping to further improve stability of the bias signal at the pixels.

Figure 9:
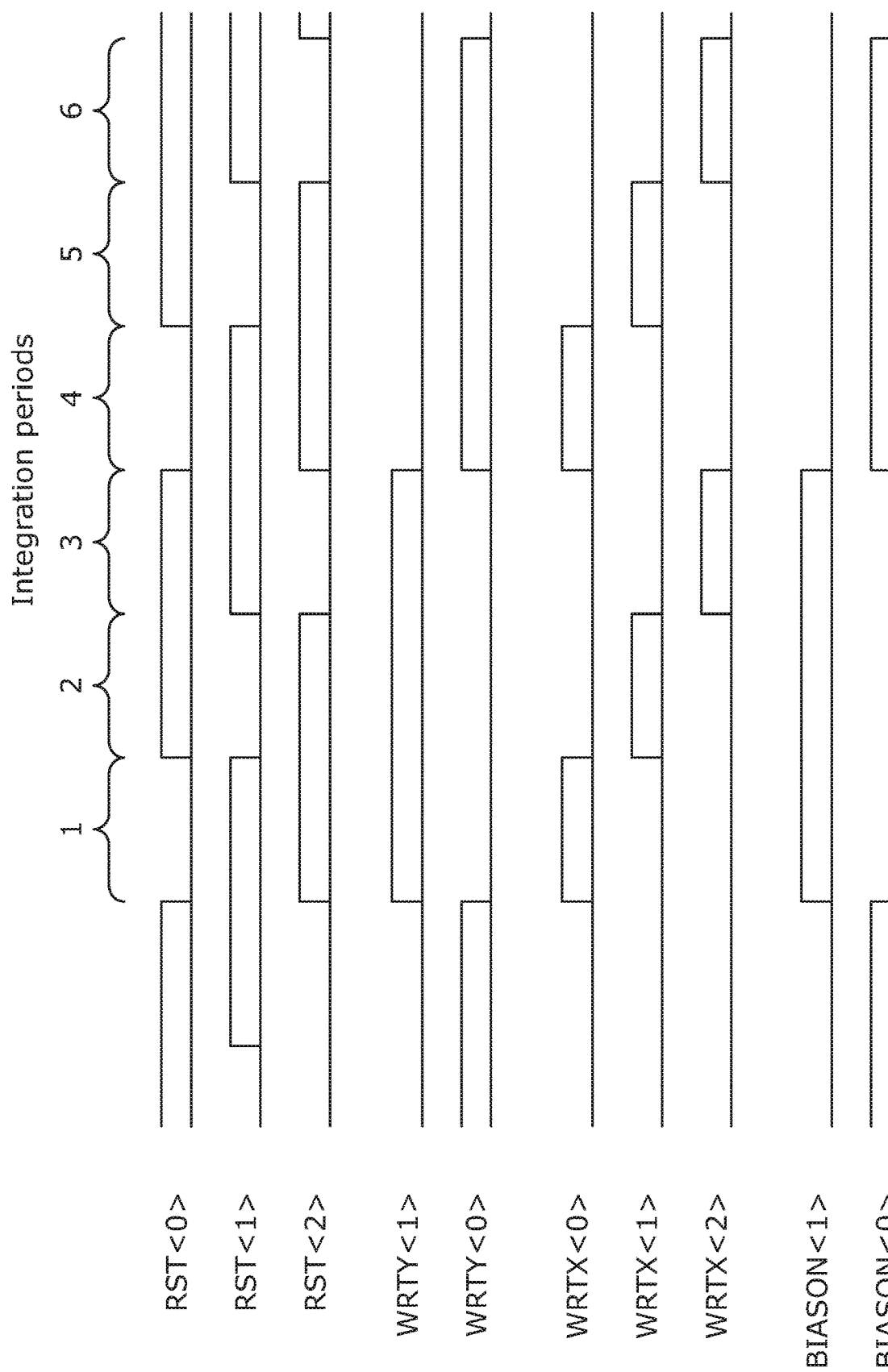
FIG. 9 shows an example of similar signal timing where there are six subsets of pixels with three subsets in the column direction and two in the row direction.

FIG. 9 shows how the signalling scheme can be expanded to implement temporal pixel multiplexing using six pixel subsets, arranged as already shown in FIG. 7 but with an extra row of pixels with signals RST<2>, WRTX<2> and READ<2> (although note that the READ signals have been omitted from FIG. 9 for brevity).

Figure 10:
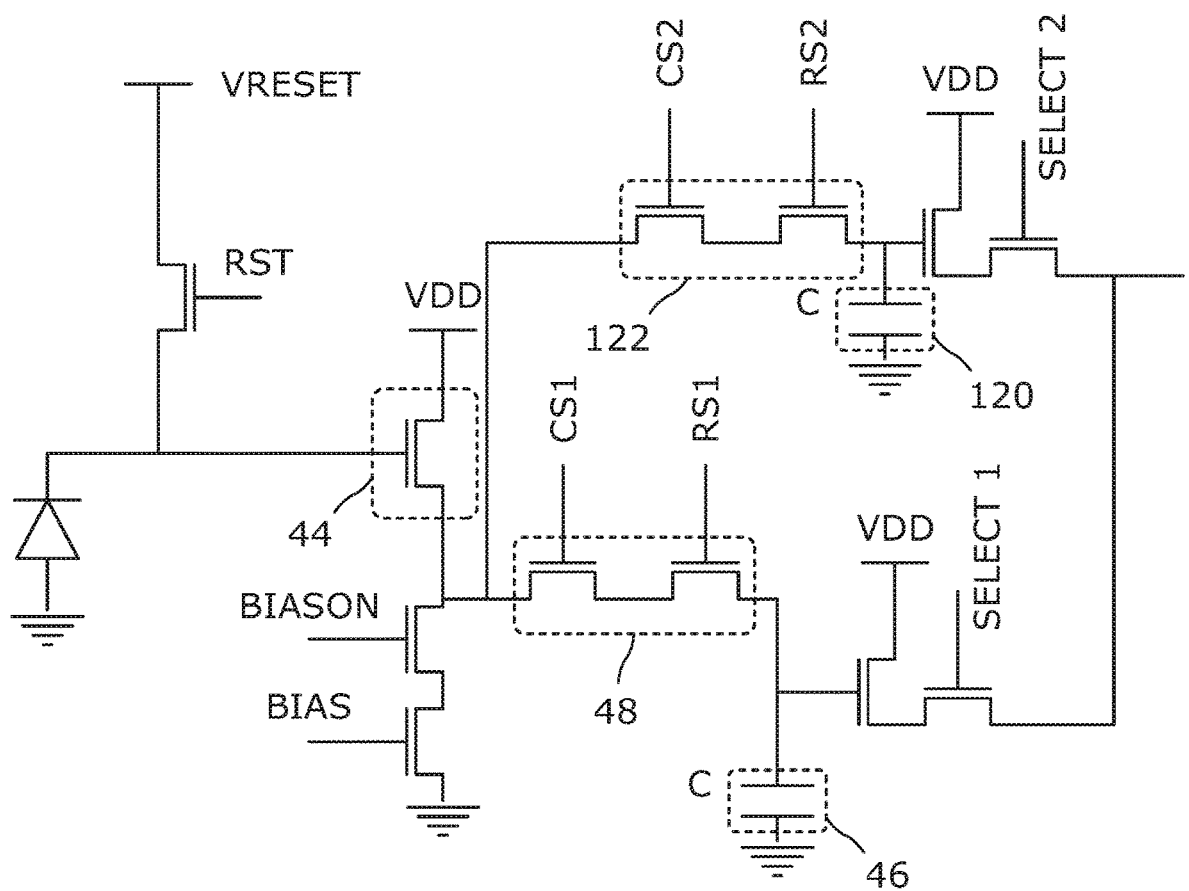
FIG. 10 is similar to FIG. 6 but where the sample stage and storage node are duplicated in parallel to provide storage of exposure signal from two different integration periods before readout from the pixel.

As already mentioned above, the described pixel configurations can be varied in a number of ways, for example to add further sample stages and/or storage nodes in series and/or in parallel to the sample stage and storage node depicted in FIGS. 5 and 6. FIG. 10 shows, for example, how the pixel may further comprise a second storage node 120 arranged to store the exposure signal output from the buffer amplifier 44, and a second sample stage 122 disposed between the buffer amplifier and the second storage node and arranged to select whether the exposure signal is passed to the second storage node 120, the readout stage being arranged to provide readout from the pixel of the exposure signals from both the storage node and the second storage node.

In order to suitably control the second sample stage 122 second column sample lines and second row sample lines are required in the device to provide the respective second COLUMN SAMPLE and ROW SAMPLE signals designated in the figure as CS2 and RS2, with the S1 and S2 signals of FIG. 5 for the first sample stage 48 being depicted as CS1 and RS1. In this way, exposure signals for two different integration periods can be stored in each pixel for subsequent readout, or one of the pairs of storage node and sample stage can be used to store a baseline or reset signal to enable a baseline comparison for the other, for example using the technique generally referred to as correlated double sampling.

Further, in order to readout the separate exposure signals (one of which may be a baseline or reset signal), the device implementing the pixel of FIG. 10 is provided with duplicate row select lines for readout from each row, denoted SELECT1 and SELECT2. As an alternative, a single row select line could be provided as in the device of FIGS. 2, 5 and 6, with two column readout lines being provided for each column instead.

Of course, although two parallel groups of sample stage and storage node are depicted in FIG. 10, more than two could be implemented in the pixels of a single device.

In other variations, although a sample stage disposed between a buffer amplifier and a storage node is described, or parallel such sample stages and storage nodes, there may be other storage nodes for storing the exposure signal in series either before or after a described storage node, and other switches and stages arranged to transfer the exposure signal between such storage nodes. For example, by providing one or more further storage nodes and suitable switching arrangements for input to and output from such storage nodes, a signal from the sensor node at or shortly after reset can be stored to provide a baseline for the exposure signal from the integration period (for example for use in correlated double sampling).

It will be apparent to the person skilled in the art that various other modifications may be made to the described embodiments without departing from the scope of the invention.

The invention claimed is:

1. An apparatus comprising: a plurality of pixels arranged in rows and columns, a plurality of column sample lines each connected to pixels of a different column, and a plurality of row sample lines each connected to pixels of a different row, each pixel comprising: a photo sensor arranged to generate an exposure signal representative of radiation incident on the pixel during an integration period; a sense node arranged to receive the exposure signal from the photodiode; a buffer amplifier arranged to receive the exposure signal from the sense node; a storage node arranged to store the exposure signal output from the buffer amplifier; a sample stage disposed between the buffer amplifier and the storage node and arranged to select whether the exposure signal is passed to the storage node; and a readout stage arranged to provide readout of the exposure signal from the pixel, the sample stage of each pixel comprising: first and second sample switches in series between the buffer amplifier and the storage node of the pixel, the first sample switch being connected to the column sample line of the pixel and the second sample switch being connected to the row sample line of the pixel, such that the exposure signal is only passed to the storage node at a time when both a COLUMN SAMPLE signal on the column sample line and a ROW SAMPLE signal on the row sample line are active.

2. The apparatus of claim 1 wherein each pixel further comprises a reset structure connected to the sense node, the reset structure arranged to reset the photo sensor and the sense node when a RESET signal to the pixel is active.

3. The apparatus of claim 2 further comprising a plurality of reset lines, each reset line being connected to the pixels of a different row, and wherein for each pixel the sample switch closest in series to the storage node is connected to the row sample line, and the sample switch closest in series to the buffer amplifier is connected to the column sample line.

4. The apparatus of claim 1 wherein the photo sensor of each pixel is a partially pinned photo diode.

5. The apparatus of claim 1 wherein the buffer amplifier of each pixel comprises a transistor arranged as a source follower responsive to the exposure signal at the sense node, and the first and second sample switches are transistors in series between an output of the buffer amplifier and the storage node.

6. The apparatus of claim 5, arranged such that the BIAS ON signal for a pixel is active for a pixel at least when the COLUMN SAMPLE and ROW SAMPLE signals are active for selecting that pixel.

7. The apparatus of claim 6 arranged such that, during operation of the apparatus, the BIAS ON signal is always inactive for at least one third of the pixels.

8. The apparatus of claim 1 wherein the buffer amplifier of each pixel is provided with a bias current by a bias structure within the pixel, the bias structure comprising a bias switch arranged to turn on the bias current to the buffer amplifier when activated by a BIAS ON signal from outside the pixel.

9. The apparatus of claim 8 wherein the bias structure of each pixel comprises a bias transistor connected to a corresponding transistor outside the pixel to form a current mirror for providing the bias current to the buffer amplifier of the pixel.

10. The apparatus of claim 1 wherein the storage node of each pixel comprises one or more of: an NMOS capacitor; a MIM capacitor; and a metal fringe capacitor.

11. The apparatus of claim 1 further comprising a second storage node arranged to store the exposure signal output from the buffer amplifier, and a second sample stage disposed between the buffer amplifier and the second storage node and arranged to select whether the exposure signal is passed to the second storage node, the readout stage being arranged to provide readout from the pixel of the exposure signals from both the storage node and the second storage node.

12. The apparatus of claim 1, configured such that the pixels comprise a plurality of mutually exclusive subsets of the pixels, and configured to generate the COLUMN SAMPLE and ROW SAMPLE signals, and if dependent on claim 2 also the RESET signals, such that the exposure signals for readout from the storage nodes represent a different integration period for the pixels of each subset.

13. The apparatus of claim 12 configured to generate the COLUMN SAMPLE and ROW SAMPLE signals such that transfer of the exposure signal from the buffer amplifier to the storage node ceases at substantially the same time for all pixels of each of the subsets, but at a different time for each subset.

14. The apparatus of claim 12 arranged such that the integration periods for the subsets of pixels are non-overlapping.

15. The apparatus of claim 12, configured such that each subset of pixels is interleaved with each of the other subsets.

16. The apparatus of claim 12 wherein each subset of pixels extends over substantially the whole of the plurality of pixels.

17. The apparatus of claim 12 configured such that transfer of the exposure signal for each pixel from the buffer amplifier to the storage node ceases by the ROW SAMPLE signal becoming inactive before the COLUMN SAMPLE signal becomes inactive.

18. The apparatus of claim 12 arranged such that the readout from the pixels of the exposure signals is deferred until the exposure signals for all of the subsets of pixels have been transferred to the respective storage nodes.

19. A method of operating an active pixel sensor comprising a plurality of pixels arranged in rows and columns, each pixel comprising first and second switches in series between a sense node arranged to receive an exposure signal from a photo sensor, and a storage node for storing the exposure signal, wherein the first switches of each column of pixels are connected in common to a corresponding column sample line for control, and the second switches of each row of pixels are connected in common to a corresponding row sample line for control, the method comprising:

defining a plurality of mutually exclusive subsets of the pixels;

controlling the first and second switches such that, for each subset, the exposure signals from all pixels of the subset are transferred to the respective storage nodes of those pixels at substantially the same integration period end time, the integration period end time for each subset being different; and reading out the exposure signals for each the subsets only after the integration period end times of all of the subsets.

20. The method of claim 19 wherein the active pixel sensor further comprises a plurality of reset lines, each row of pixels being connected in common to a corresponding reset line for reset, the series switch in each pixel closest in series to the storage node is connected to the row sample line for that pixel, and controlling the first and second switches comprises defining the integration end time for each pixel by turning off the series switch closest in series to the storage node before turning off the series switch furthest in series to the storage node.

21. The method of claim 19 wherein the subsets of the pixels are interleaved.

22. The method of claim 19 further comprising forming a series of sequential image frames, each image frame being formed using the read out exposure signals from a different one of the subsets of pixels.

* * * * *